(12) United States Patent
Yomogida

(10) Patent No.: US 6,588,668 B1
(45) Date of Patent: Jul. 8, 2003

(54) BAR CODE SCANNER

(75) Inventor: Matsuo Yomogida, Miyagi (JP)

(73) Assignee: Tohoku Ricoh Co., Ltd., Miyagi (JP)

( * ) Notice: Subject to any disclaimer, the term of this patent is extended or adjusted under 35 U.S.C. 154(b) by 206 days.

(21) Appl. No.: 09/691,222

(22) Filed: Oct. 19, 2000

(65) Prior Publication Data

(65)

(30) Foreign Application Priority Data

Oct. 26, 1999 (JP) .......................... 11-303846

(51) Int. Cl.[7] .............................................. G06K 7/10
(52) U.S. Cl. .............. 235/462.37; 235/380; 235/462.37; 235/375; 235/462.06; 235/462.43
(58) Field of Search .......................... 235/380, 462.37, 235/462.38, 375, 462.43, 462.06

(56) References Cited

U.S. PATENT DOCUMENTS

| | | | | |
|---|---|---|---|---|
| 4,019,026 A | * | 4/1977 | Nakanishi et al. ...... | 235/462.06 |
| 4,418,277 A | * | 11/1983 | Tremmel et al. ............ | 235/419 |
| 5,047,617 A | * | 9/1991 | Shepard et al. ........ | 235/462.36 |
| 5,321,246 A | * | 6/1994 | Shepard et al. ......... | 235/462.38 |
| 5,979,761 A | * | 11/1999 | Wurz et al. .................. | 235/454 |
| 6,000,619 A | * | 12/1999 | Reddersen et al. ..... | 235/462.43 |

FOREIGN PATENT DOCUMENTS

| | | |
|---|---|---|
| JP | 62-62375 | 4/1987 |
| JP | 4-49726 | 11/1992 |

* cited by examiner

Primary Examiner—Michael G. Lee
Assistant Examiner—Steven S. Paik
(74) Attorney, Agent, or Firm—Armstrong, Westerman & Hattori, LLP (57) ABSTRACT

A laser diode control board (9), a scanning deflection member control board (12), and an electric signal processing board (11) composing a bar code scanner are formed of individual boards, the laser diode control board (9) is vertically disposed on the side opposite to a collimate lens (5) with respect to the laser diode (2) such that the board face thereof closely faces the laser diode, the electric signal processing board (11) is disposed below the collimate lens (5) along the irradiation direction of a laser beam in a vertical position, the scanning deflection member control board (12) is disposed at the rear in the irradiation direction of the laser beam with respect to the scanning deflection member (8), and the boards are attached to a holding member (4) with the laser diode (2), the collimate lens (5), a mirror (6), the scanning deflection member (8), and a light receiving element (3).

6 Claims, 6 Drawing Sheets

BAR CODE SCANNER

BACKGROUND OF THE INVENTION

1. Field of the Invention

The present invention relates to a bar code scanner (reader) for reading a bar code by applying light emitted from a light source such as a laser diode or the like to a bar code portion and receiving its reflected light by means of a light receiving element.

2. Description of the Related Art

A bar code scanner is an apparatus which applies light such as a laser beam emitted from a light source toward a bar code portion where a bar code is printed on a case or a package of a product and reads the bar code from an electronic signal obtained by receiving its reflected light. By virtue of an advantage of being able to read a bar code even if the bar code scanner is away from the bar code portion, it is widely used in a distribution field, sales and management departments, and the like these days.

Such a bar code scanner is disclosed in, for example, Japanese Utility Model Laid-open Publication No. 62-62375.

Figure 8:
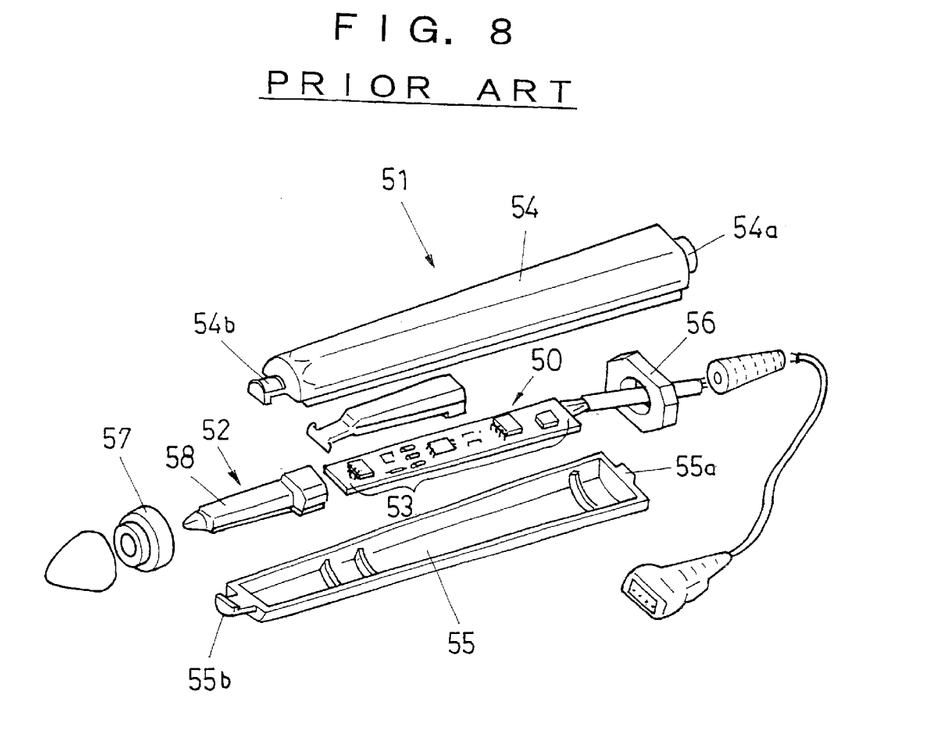
FIG. 8 is an exploded perspective view showing an example of a conventional bar code scanner.

This bar code scanner houses and holds a sensor body 52 and a printed board 50 with electric processing circuits 53 being mounted thereon which are electrically connected in a split case 51 which is split into an upper case 54 and a lower case 55 as shown in FIG. 8.

In the bar code scanner, a coupling cap 56 fits over extending cylindrical portions 54a and 55a which are respectively formed at the right end portions in FIG. 8 of the upper case 54 and the lower case 55 of the split case 51 with components to be housed such as the sensor body 52, the printed board 50, and the like being set at predetermined positions in the split case 51.

Further, an intermediate cap 57 fits over extending cylindrical portions 54b, 55b which are respectively formed at the left end portions of the upper case 54 and the lower case 55.

The sensor body 52 housed in the split case 51 houses a light emitting element such as an LED or the like and a light receiving element such as a transistor or the like at predetermined positions in an outer case 58 which can be vertically split.

Such a fixed structure of a circuit board which is provided in the bar code scanner is disclosed in, for example, Japanese Utility Model Publication No. 4-49726.

Figure 9:
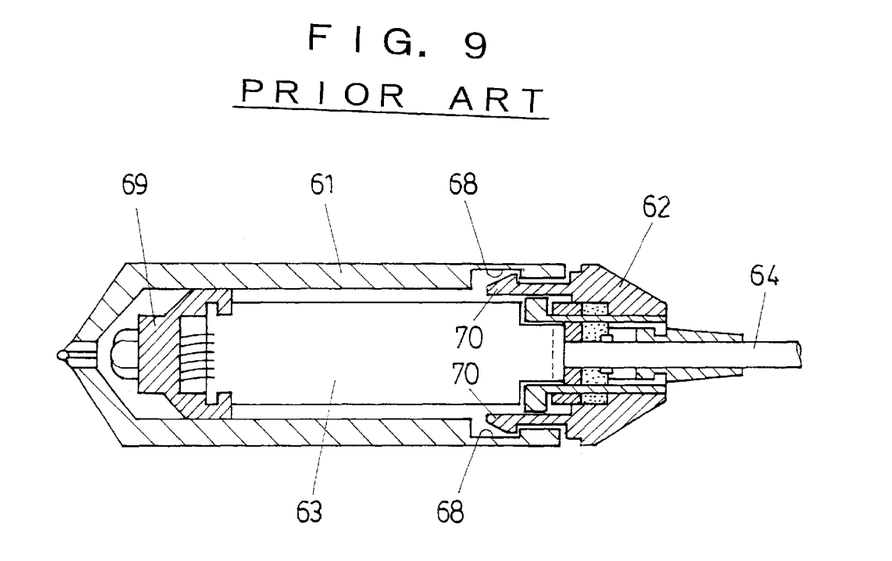
FIG. 9 is a vertical sectional view showing another example of a conventional bar code scanner.

In this bar code scanner, a rear end portion of a main body cover 61 is opened and a plurality of recessed portions 68 are formed in the inner face thereof near the opening, and a rear cover 62 provided with a plurality of spring-loaded engaging hooks 70 extending toward the inside of the main body cover 61 is fixed to the main body cover 61 by engaging the engaging hooks 70 to the plurality of recessed portions 68 respectively as shown in FIG. 9.

A circuit board 63 on which an optical scanner unit 69 is mounted at the front end portion and to which a cable 64 is connected at the rear end portion is attached to the rear cover 62. Accordingly, as for the bar code scanner, the circuit board 63 is inserted to a predetermined position shown in FIG. 9 in the main body cover 61, and the engaging hooks 70 of the rear cover 62 are engaged to the plurality of the recessed portions 68 of the main body cover 61, thereby completing attachment of the circuit board 63 to the inside of the main body cover 61.

Some bar code scanner scans the top of a bar code face by directing a beam of light emitted from a light source such as a laser diode to right and left by a mirror (a deflection member) attached to a rotating shaft of a motor, receives its reflected light by a light receiving element, and decodes numerals, symbols, and the like on the bar code by a detection signal from the light receiving element.

However, as is clear from FIG. 8, in the aforesaid bar code scanner disclosed in Japanese Utility Model Laid-open Publication No. 62-62375, the electric processing circuits for controlling various kinds of operations of the bar code scanner are closely provided on one circuit board, provided in the pen-type elongated split case such that the whole circuit board extends along the longitudinal direction of the split case, thereby bringing about a problem that the whole length of the bar code scanner becomes longer than required.

In the case of the latter bar code scanner disclosed in Japanese Utility Model Publication No. 4-49726, the rear cover is fixed to the main body cover by respectively engaging the spring-loaded engaging hooks which are formed at the rear cover in correspondence with the plurality of recessed portions formed in the inner face of the main body cover near the rear end portion, to the recessed portions. The engagement fixes the circuit board provided integrally with the rear cover at a predetermined position, resulting in occurrence of inconveniences when the bar code scanner is dropped by accident.

In other words, in the case of the handy-type bar code scanner of this pen type, it is normally used by being held by a hand, and thus it is often dropped on the floor or the like by accident.

At that time, for example, in the case of the bar code scanner of the type which deflects a beam of light emitted from a light source by a mirror which is rotated by a motor to scan the top of a bar code face, a component especially with a certain weight as a motor is susceptible to displacement due to the impact upon a drop.

SUMMARY OF THE INVENTION

The present invention is made in view of the aforesaid problems, and its object is to downsize a bar code scanner for reading a bar code using a beam of light emitted from a light source without making it longer than required. Another object is to assure location accuracy of components embedded in the bar code scanner even when it is dropped by accident.

In order to attain the above objects, in this invention, a bar code scanner comprising: a laser diode whose operation is controlled by a laser diode control section; a deflection member for reflecting a laser beam emitted from the laser diode and passing through a collimate lens into a collimated beam; a scanning deflection member for deflecting the laser beam from the deflection member to scan a bar code portion; a scanning deflection member control section for controlling drive of the scanning deflection member; a light receiving element for receiving reflected light that the laser beam strikes the bar code portion and is reflected; and an electric signal processing section for processing an electronic signal outputted from the light receiving element, is structured as follows.

A laser diode control board provided with the laser diode control section, a scanning deflection member control board provided with the scanning deflection member control section, and an electric signal processing board provided with the electric signal processing section are formed of individual boards, and the laser diode control board, the scanning deflection member control board, the electric signal processing board, the laser diode, the collimate lens, the deflection member, the scanning deflection member, and the light receiving element are individually attached to one holding member to form the bar code scanner.

Further, it is desirable to structure the bar code scanner as follows.

In the above bar code scanner, the deflection member is disposed at the front in an irradiation direction of the laser beam emitted from the laser diode to the collimate lens, and the laser diode control board is disposed on the side opposite to the collimate lens with respect to the laser diode to be orthogonal to a top face of the holding member such that a board face thereof closely faces the laser diode.

The scanning deflection member is disposed to be closely situated next to the collimate lens and to be at the same height as that of the collimate lens, and the electric signal processing board is disposed below the collimate lens along the irradiation direction of the laser beam in a position orthogonal to the top and bottom faces of the holding member.

Further, the light receiving element is disposed below the scanning deflection member, and the scanning deflection member control board is disposed at the rear in the irradiation direction of the laser beam with respect to the scanning deflection member.

Furthermore, it is preferable that the laser diode control board, the scanning deflection member control board, and the electric signal processing board are individually fixed to the holding member by screws.

Moreover, it is effective that a cover for covering the holding member to which the boards are individually screwed is provided, and the cover is fixed to the holding member by a screw.

The above and other objects, features and advantages of the invention will be apparent from the following detailed description which is to be read in conjunction with the accompanying drawings.

BRIEF DESCRIPTION OF THE DRAWINGS

FIG. 2 is a perspective view showing a unit member integrally arranged in a cover of the pen-type bar code scanner of the same with a decoder section and the like;

DETAILED DESCRIPTION OF THE PREFERRED EMBODIMENTS

Hereinafter, embodiments of the present invention will be explained with the accompanying drawings.

Figure 1:
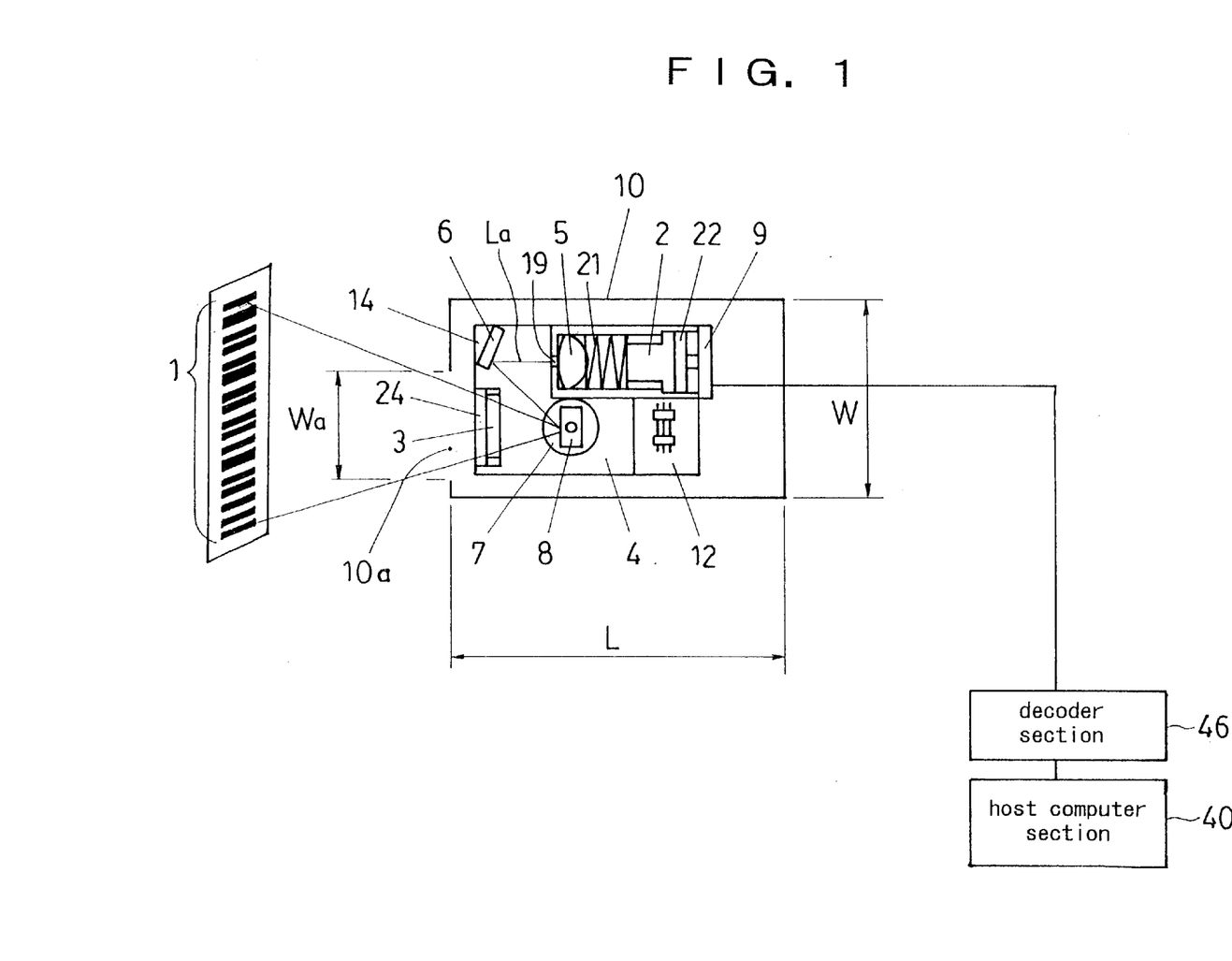
FIG. 1 is a diagram showing an embodiment applying a bar code scanner according to the present invention to a pen-type bar code scanner with a bar code portion.
Figure 2:
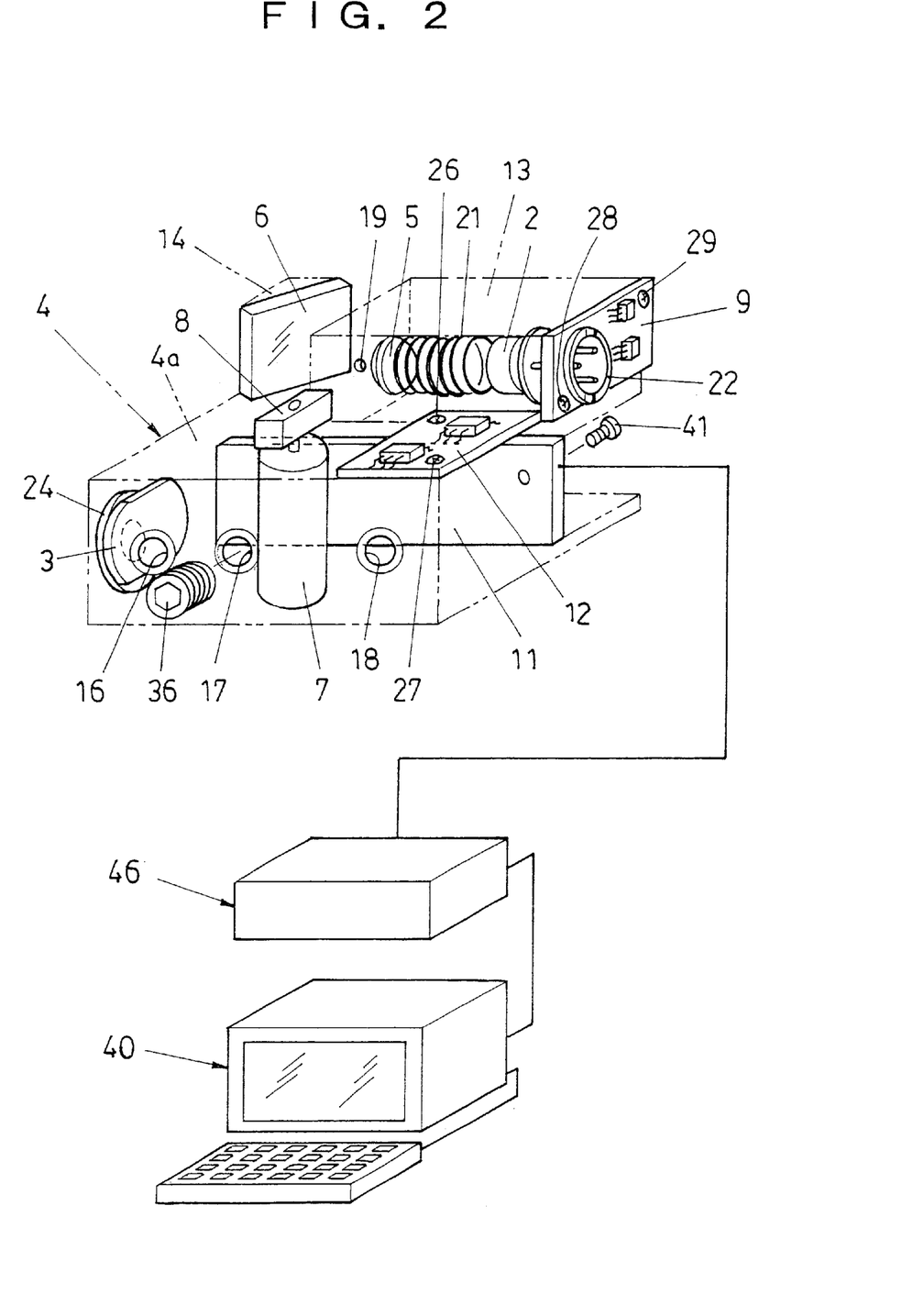

FIG. 1 is a diagram showing an embodiment applying a bar code scanner according to the present invention to a pen-type bar code scanner with a bar code portion, and FIG. 2 is a perspective view showing a unit member integrally arranged in a cover of the pen-type bar code scanner of the same with a decoder section and the like.

The pen-type bar code scanner reads a bar code by applying a laser beam to a bar code portion 1 and receiving its reflected light.

More specifically, laser light by emission of a laser diode 2 is made into a collimated beam by a collimate lens 5, brought into a laser beam La by passing through an aperture (a small hole) and emitted, and applied toward the bar code portion 1 via a mirror 6 that is a deflection member and a scanning deflection member 8, and then its reflected light is received by, for example, a light receiving element 3 which is a phototransistor and converted to an electric signal corresponding to brightness of the bar code portion 1, and the signal is analyzed to thereby read the bar code.

The bar code scanner is used while connected to a host computer section 40 through a decoder section 46 provided outside.

It should be noted that a unit member of the bar code scanner in which components are attached to a holding member 4 is exaggeratingly shown, larger than the decoder section 46 and the host computer section 40, but the unit member actually has a size capable of being housed in a main body cover of the pen-type bar code scanner shown in FIG. 9.

The laser diode 2 and the light receiving element 3 are individually attached to predetermined positions of the holding member 4 provided in a cover 10.

Further, the collimate lens 5, the deflecting mirror 6, the scanning deflection member 8 which rotates while fixed to a rotating shaft of a motor 7, a laser diode control board 9 on which a laser diode control section is provided, an electric signal processing board 11 (see FIG. 2) on which an electric signal processing section is provided, and also a scanning deflection member control board 12 on which a scanning deflection member control section is provided, are integrally provided on the holding member 4.

Figure 3:
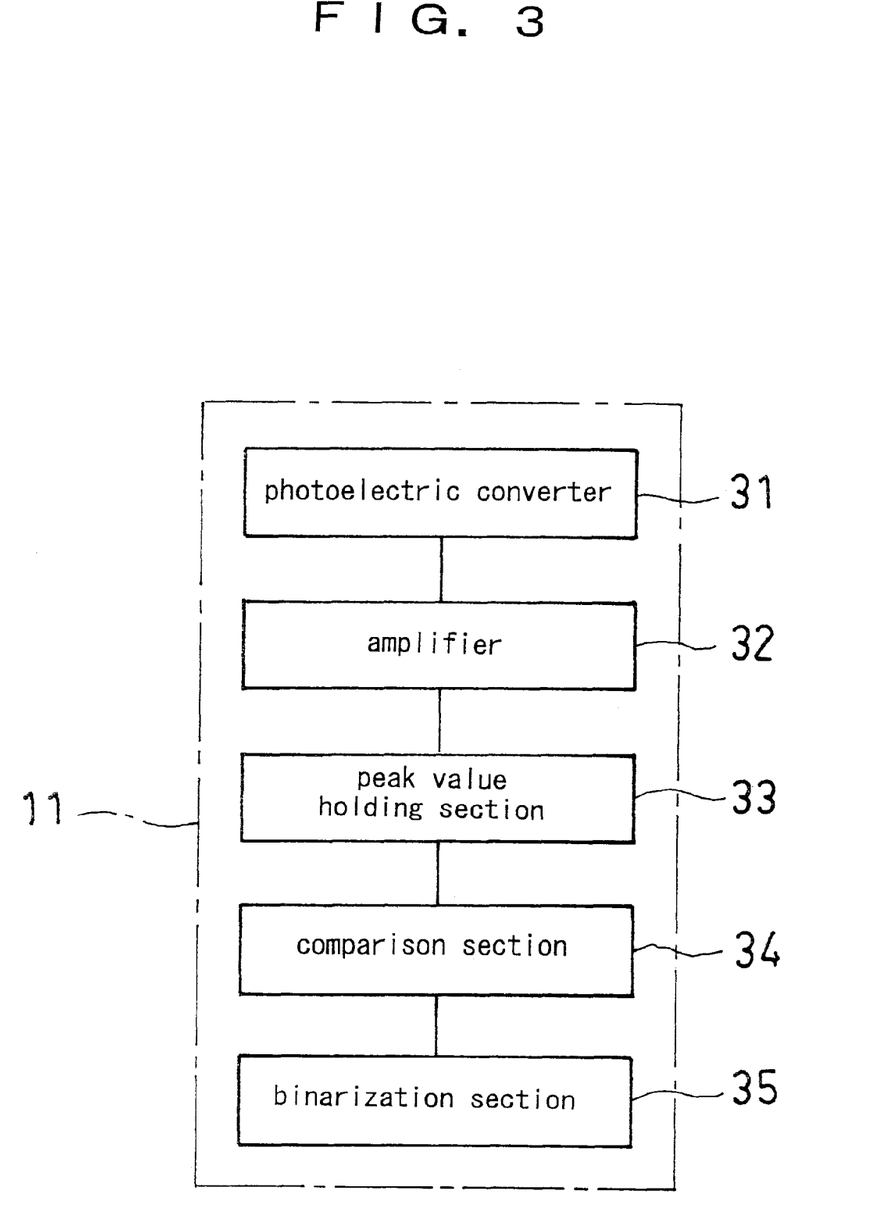
FIG. 3 is a block diagram showing a circuit configuration of an electric signal processing board provided in the pen-type bar code scanner of the same.

The electric signal processing board 11 is a board provided with sections for processing an electric signal outputted from the light receiving element 3, provided with a photoelectric converter 31, an amplifier 32, a peak value holding section 33, a comparison section 34, and a binarization section 35 as shown in FIG. 3.

Figure 4:
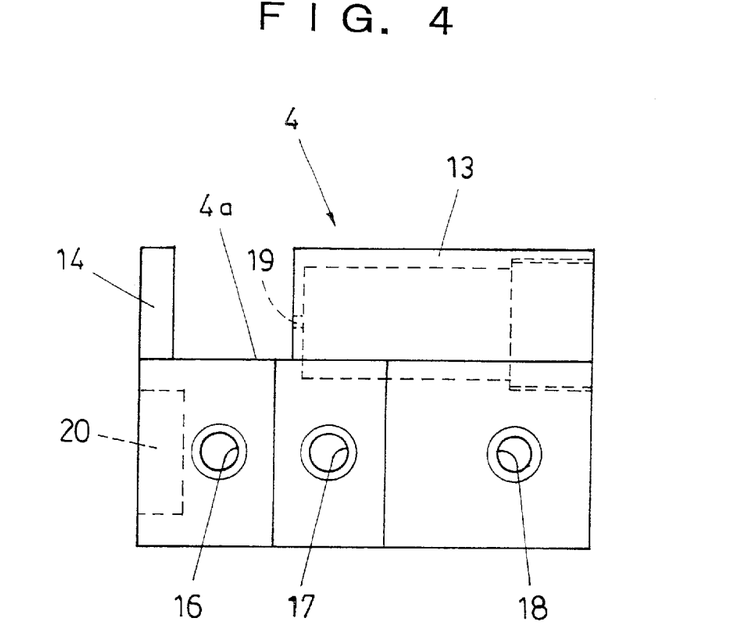
FIG. 4 is a front view showing a holding member provided in the pen-type bar code scanner of the same.
Figure 5:
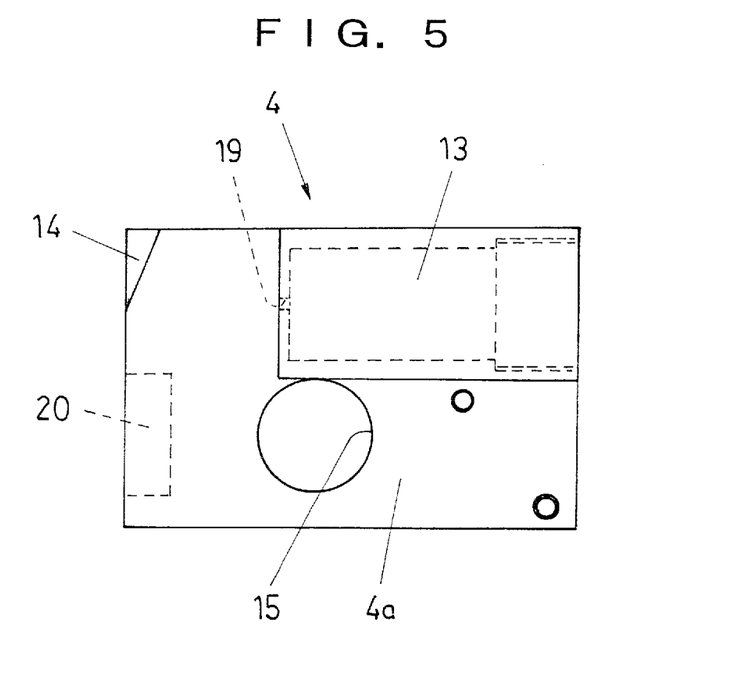
FIG. 5 is a plane view of the holding member of the same.
Figure 6:
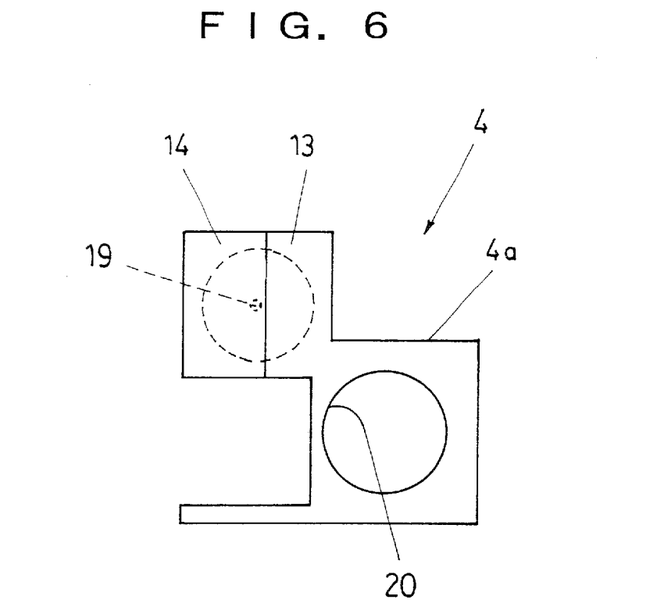
FIG. 6 is a left side view of the holding member of the same.

The holding member 4 has a shape as shown in FIG. 4 to FIG. 6, in which a laser diode housing portion 13 and a mirror attachment portion 14 to which the mirror 6 is attached are provided while protruding upward from a top plane 4a. The top plane 4a is provided with a motor insertion hole 15 into which a yoke portion of the motor 7 is inserted as the plane shape of the holding member 4, as shown in FIG. 5.

Figure 7:
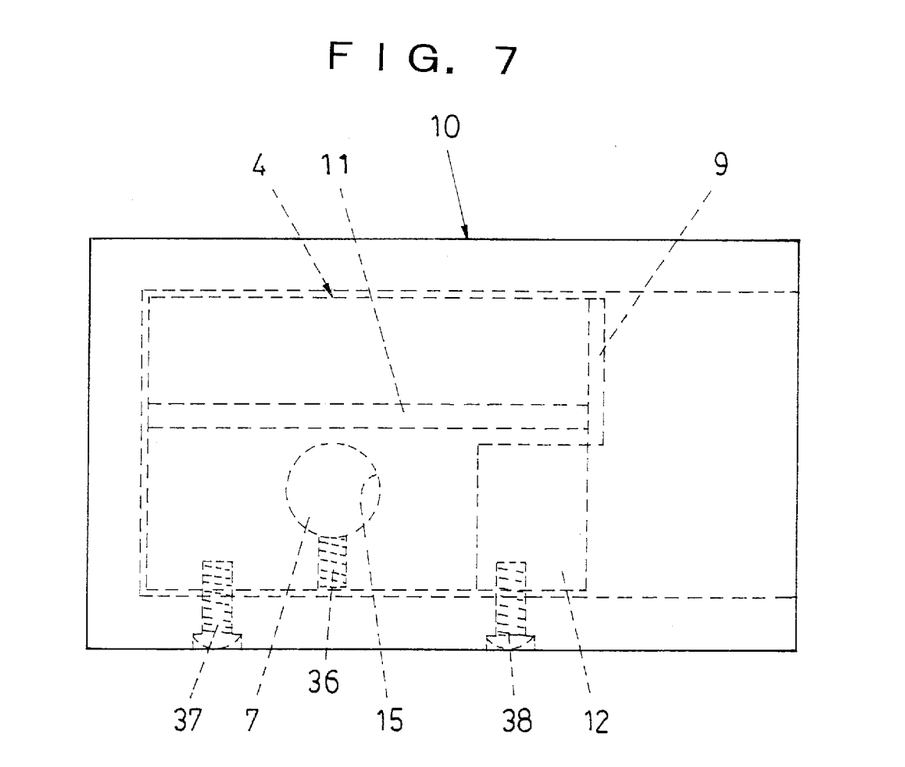
FIG. 7 is a plane view showing a state in which a cover is put over the holding member of the same and screwed.

Furthermore, in the front face of the holding member 4, screw holes 16, 17, 18 which are three taps for attachment are formed at spaced intervals as shown in FIG. 4. The motor 7 (FIG. 1) whose yoke portion is inserted into the motor insertion hole 15 is fixed by a screw 36 using the middle screw hole 17 as shown in FIG. 7.

Through the use of the screw holes 16 and 18 on both sides of the screw hole 17, the cover 10 for covering the holding member 4 to which the laser diode control board 9, the electric signal processing board 11, and the scanning deflection member control board 12 are screwed respectively is fixed by screws 37, 38.

Moreover, an aperture 19 formed by opening a small hole as shown in FIG. 5 and FIG. 6 is provided near the center of a left end face of the laser diode housing portion 13 of the holding member 4.

As shown in FIG. 4 and FIG. 6, a circular opening 20 for receiving reflected light into the light receiving element 3 (FIG. 1) is formed at a portion of a left face of the holding member 4 below the top plane 4a.

In the holding member 4, the collimate lens 5 is disposed in the laser diode housing portion 13 such that the center of the collimate lens 5 is coincident with the center of the aperture 19 as shown in FIG. 1 and FIG. 2. In the laser diode housing portion 13, a spring 21 for pushing the collimate lens 5 toward the aperture 19 side is provided, and further the laser diode 2 is provided and fixed at a predetermined position by a laser diode fixing member 22.

The mirror 6 is fixed to the mirror attachment portion 14 of the holding portion 4 such that the mirror face thereof faces the aperture 19.

On the other hand, the light receiving element 3 is disposed near the opening 20 (see FIG. 6 and the like) of the holding member 4 and fixed to the holding member 4 by a light receiving element fixing member 24.

The electric signal processing board 11 provided with the photoelectric converter 31, the amplifier 32, the peak value holding section 33, the comparison section 34, and the binarization section 35 which have been explained with FIG. 3 is disposed near the center of the holding member 4 in a position orthogonal to the top and bottom faces of the holding member 4 such that the longitudinal direction of the electric signal processing board 11 is in the irradiation direction of the laser beam from the laser diode 2 as shown in FIG. 2 and fixed to the holding member 4 by a plurality of set- screws 41.

On the top plane 4a of the holding member 4, the scanning deflection member control board 12 provided with the scanning deflection member control section for controlling drive of the motor 7 for rotating the scanning deflection member 8 is disposed at the rear (on the right in FIG. 2) in the irradiation direction of the laser beam with respect to the scanning deflection member 8 and fixed by set-screws 26 and 27.

The laser diode control board 9 provided with the laser diode control section for controlling operations of the laser diode 2 is disposed on the side opposite to the collimate lens 5 with respect to the laser diode 2 to be orthogonal to the top plane 4a of the holding member 4 such that the board face thereof closely faces the laser diode 2. The laser diode control board 9 is fixed to a right end face of the holding member 4 by set-screws 28 and 29.

The scanning deflection member 8, as is clear from FIG. 2, has a shape of a rectangular prism with a mirror face made by evaporating aluminum on one face, and reflects a laser beam directed at its mirror face to thereby deflect it. Then, the scanning deflection member 8 is rotated by the motor 7, thereby allowing the laser beam to scan the bar code portion 1.

As described above, in the bar code scanner, the laser diode control board 9, the scanning deflection member control board 12, and the electric signal processing board 11 are formed of individual boards, and those boards, the laser diode 2, the collimate lens 5, the mirror 6, the scanning deflection member 8, and the light receiving element 3 are attached to the holding member 4 individually.

The mirror 6 is disposed at the front in the irradiation direction of the laser beam emitted from the laser diode 2 with respect to the collimate lens 5. The laser diode control board 9 is disposed on the side opposite to the collimate lens 5 with respect to the laser diode 2 to be orthogonal to the top plane 4a of the holding member 4 such that the board face thereof closely faces the laser diode 2. Further, the scanning deflection member 8 is disposed to be closely situated next to the collimate lens 5 and to be at nearly the same height as that of the collimate lens 5.

The electric signal processing board 11 is disposed below the collimate lens 5 along the irradiation direction of the laser beam in a position orthogonal to the top and bottom faces of the holding member 4, the light receiving element 3 is disposed below the scanning deflection member 8, and the scanning deflection member control board 12 is disposed at the rear in the irradiation direction of the laser beam with respect to the scanning deflection member 8.

Consequently, all the components can be compactly and closely attached to the holding member 4, whereby a width W of the cover 10 can be decreased and a length L of the cover 10 can be also decreased to a considerable degree as shown in FIG. 1, resulting in a very small bar code scanner.

The scanning deflection member 8 is disposed at a position close to an opening 10a of the cover 10, so that a width W of the opening 10a can be also decreased even though it is a bar code scanner of the type which scans by directing the laser beam to right and left.

As explained with FIG. 7, in this bar code scanner, the motor 7 is fixed to the holding member 4 by the screw 36 which is screwed to the screw hole 17 (FIG. 4) with the yoke portion of the motor 7 being inserted to a predetermined position in the motor insertion hole 15.

Further, the electric signal processing board 11 is fixed to the holding member 4 by the plurality of set-screws 41, and the scanning deflection member control board 12 by the set-screws 26 and 27 respectively. Also the laser diode control board 9 is fixed to the right end face of the holding member 4 by the set-screws 28 and 29.

Thus, even when the bar code scanner is dropped on the floor or the like by accident, positional deviation hardly occurs in the components and boards due to the drop because they are securely fixed to the holding member 4 by the screws.

Since the cover 10 is also securely fixed to the holding member 4 by the screws 37 and 38 from the outside as described with FIG. 7, thereby avoiding deviation in location accuracy due to drop impact and improving assembly workability.

At the time of use of this bar code scanner, at a push of an operation button not shown, the laser diode control section provided on the laser diode control board 9 causes the laser diode 2 to emit light, resulting in emission of the laser beam La from the aperture 19 as shown in FIG. 1.

Accordingly, the bar code scanner is sighted such that the front end side on the left in FIG. 1 is oriented to the bar code portion 1 and the laser beam strikes the bar code portion 1, and the scanning deflection member 8 is rotated by the motor 7, whereby the laser beam deflected by the scanning deflection member 8 scans the bar code portion 1. The reflected light, the laser beam having struck the bar code portion 1 and been reflected, is received by the light receiving element 3.

An amount of the reflected light, that is, an amount of the received light by the light receiving element 3 varies in accordance with brightness of the bar code on the bar code portion 1. An electric signal outputted from the light receiving element 3 in accordance with the received light amount is converted to voltage in the photoelectric converter 31 provided on the electric signal processing board 11 shown in FIG. 3 and amplified in the amplifier 32. Further, the peak value holding section 33 catches the variations from the above information, the comparison section 34 compares the amount of variation, and the binarization section 35 binarizes it into a digital signal.

The decoder section 46 shown in FIG. 1 and FIG. 2 analyzes the digital signal to read the bar code and sends the bar code information to the host computer section 40.

The aforesaid embodiment shows an example in which the whole shape of the unit member provided in the cover 10 is made into a rectangular box, and to match the shape, the cover 10 is also made into a rectangular box. However, it is, of course, possible to round the cover 10 in design.

Further, it is possible to provide a cable housing portion as required, at an unoccupied portion due to the reduction in length in the longitudinal direction by structuring the bar code scanner as described above, and the bar code scanner according to the present invention is not limited to the one shown in FIG. 1 to FIG. 7.

As has been described, in the bar code scanner according to the present invention, the laser diode control board, the scanning deflection member control board, and the electric signal processing board are formed of individual boards, which enables a three-dimensional arrangement of those boards, so that the apparatus can be downsized by reducing the whole apparatus in length in the irradiation direction.

Further, those boards, the laser diode, the collimate lens, the deflection member, the scanning deflection member, and the light receiving element are individually attached to one holding member, thereby increasing accuracy in assembly of the components. In addition, even when the bar code scanner is dropped by accident, the location accuracy of each component can be assured.

Furthermore, it is possible to arrange the laser diode, the collimate lens, the deflection member, the scanning deflection member, the light receiving element, the laser diode control board, the electric signal processing board, and the scanning deflection member control board at positions to be three-dimensionally compact, resulting in realization of a very small bar code scanner.

Moreover, the laser diode control board, the scanning deflection member control board, and the electric signal processing board are individually securely fixed to the holding member by the screws, thereby assuring high location accuracy thereof even when the bar code scanner is dropped because of the secure fixation of the components to the holding member by the screws.

The cover being fixed to the holding member by the screws secures the fixation of the cover, thereby preventing the cover from becoming dislodged upon dropping and the components therein from getting damaged.

The cover is attached only by tightening the screws, resulting in good workability of assembly.

What is claimed is:

1. A bar code scanner, comprising:
   a laser diode whose operation is controlled by a laser diode control section;
   a deflection member for reflecting a laser beam emitted from said laser diode and passing through a collimate lens;
   a scanning deflection member for deflecting the laser beam from said deflection member to scan a bar code portion;
   a scanning deflection member control section for controlling drive of said scanning deflection member;
   a light receiving element for receiving reflected light that the laser beam strikes the bar code portion and is reflected; and
   an electric signal processing section for processing an electronic signal outputted from said light receiving element,
   wherein a laser diode control board provided with said laser diode control section, a scanning deflection member control board provided with said scanning deflection member control section, and an electric signal processing board provided with said electric signal processing section are formed of individual boards,
   wherein the laser diode control board, the scanning deflection member control board, the electric signal processing board, said laser diode, said collimate lens, said deflection member, said scanning deflection member, and said light receiving element are individually attached to one holding member, and
   said electric signal processing board is disposed below said collimate lens along the irradiation direction of the laser beam in a position orthogonal to the top and bottom faces of said holding member.

2. The bar code scanner according to claim 1,
   wherein said deflection member is disposed at the front in an irradiation direction of the laser beam emitted from said laser diode with respect to said collimate lens;
   said laser diode control board is disposed on the side opposite to said collimate lens with respect to said laser diode to be orthogonal to a top face of said holding member such that a board face thereof closely faces said laser diode;
   said scanning deflection member is disposed to be closely situated next to said collimate lens and to be at the same height as that of said collimate lens;
   said light receiving element is disposed below said scanning deflection member; and
   said scanning deflection member control board is disposed at the rear in the irradiation direction of the laser beam with respect to said scanning deflection member.

3. The bar code scanner according to claim 1,
   wherein said laser diode control board, said scanning deflection member control board, and said electric signal processing board are individually fixed to said holding member by screws.

4. The bar code scanner according to claim 2,
   wherein said laser diode control board, said scanning deflection member control board, and said electric signal processing board are individually fixed to said holding member by screws.

5. The bar code scanner according to claim 3,
   wherein a cover for covering said holding member to which said boards are individually screwed is provided, and the cover is fixed to said holding member by a screw.

6. The bar code scanner according to claim 4,
   wherein a cover for covering said holding member to which said boards are individually screwed is provided, and the cover is fixed to said holding member by a screw.

* * * * *